Figure 1:
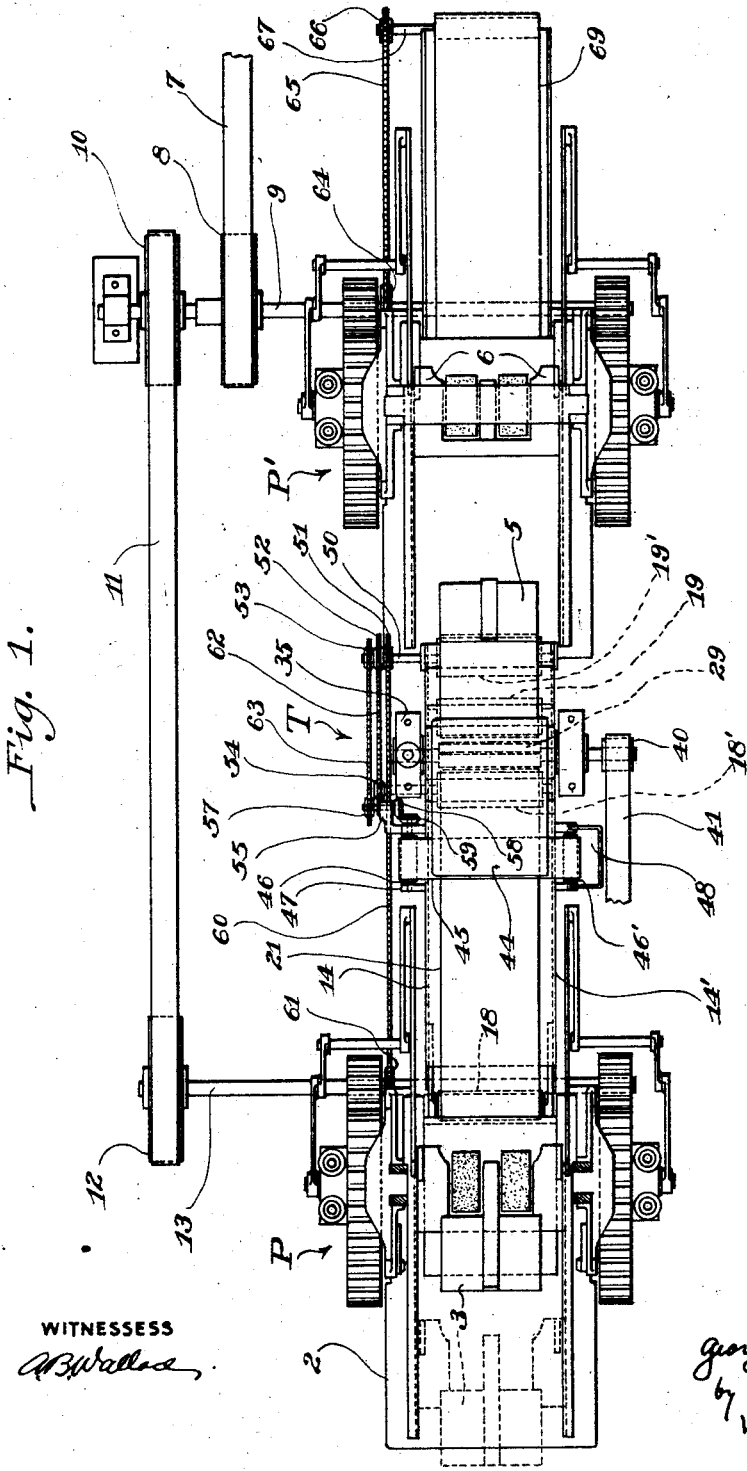

Dec. 15, 1925.

G. B. HANEY

BRICK MACHINE

Filed Nov. 28, 1923

1,565,738

6 Sheets-Sheet 1

WITNESSES

INVENTOR
George B. Haney
by Winter & Brown
his Attorneys

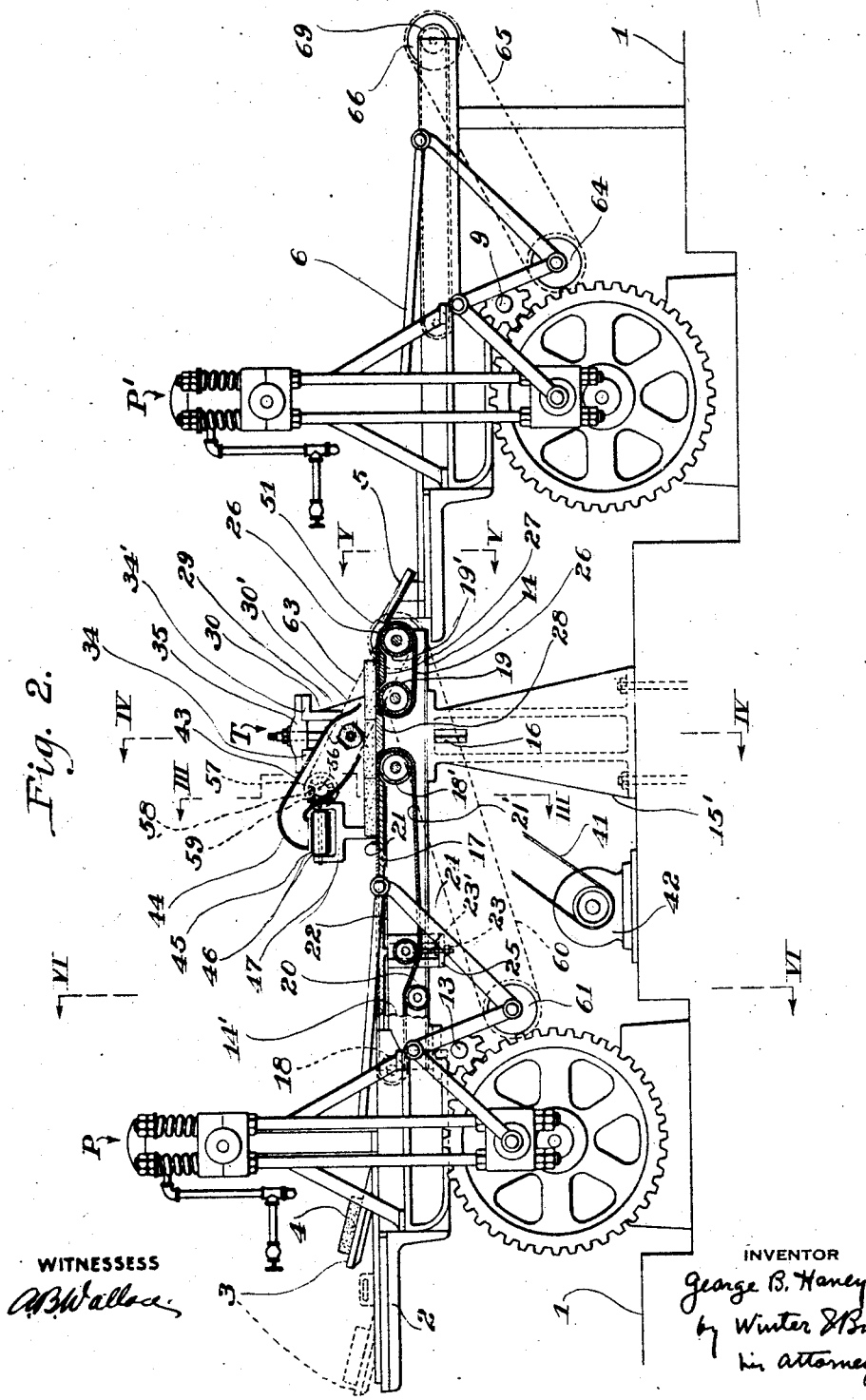

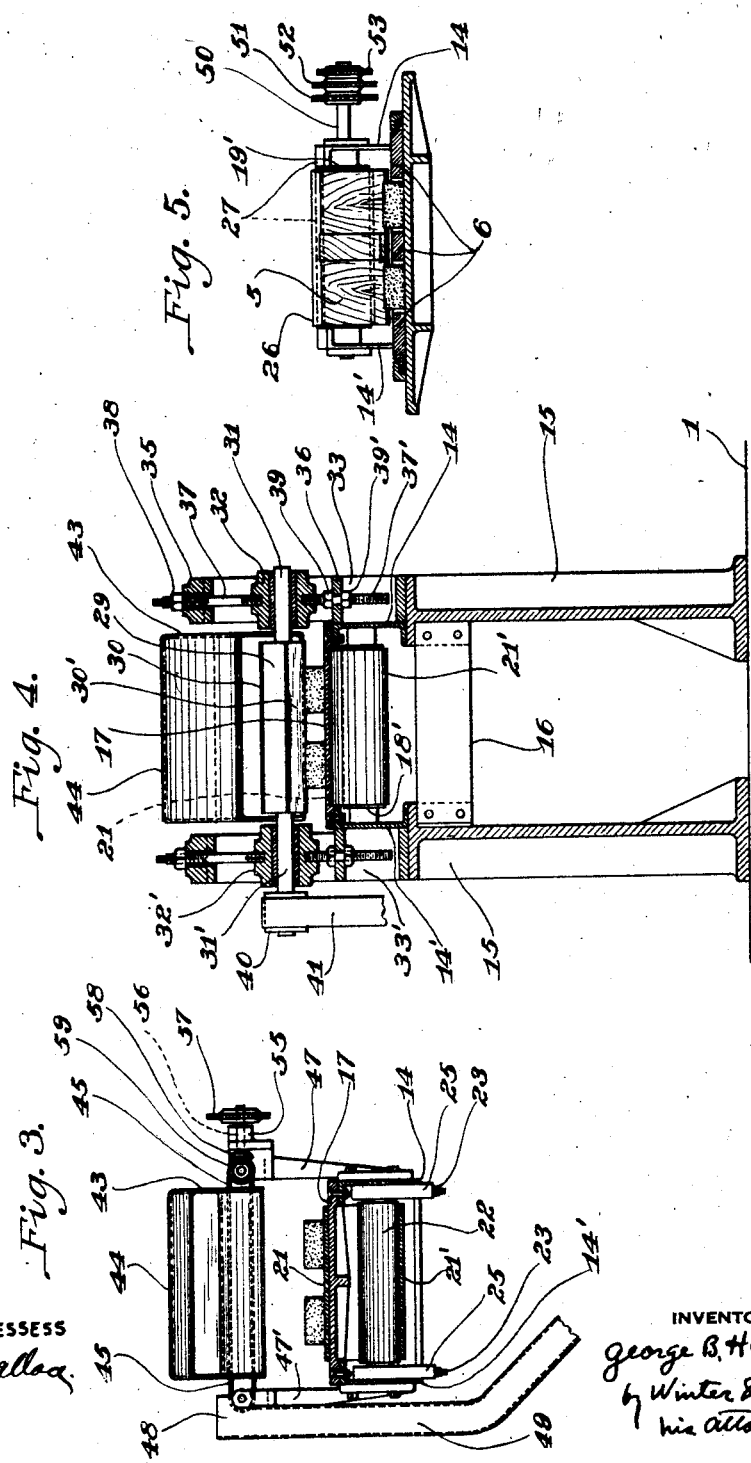

Dec. 15, 1925.
G. B. HANEY
BRICK MACHINE
Filed Nov. 28, 1923
1,565,738
6 Sheets-Sheet 4
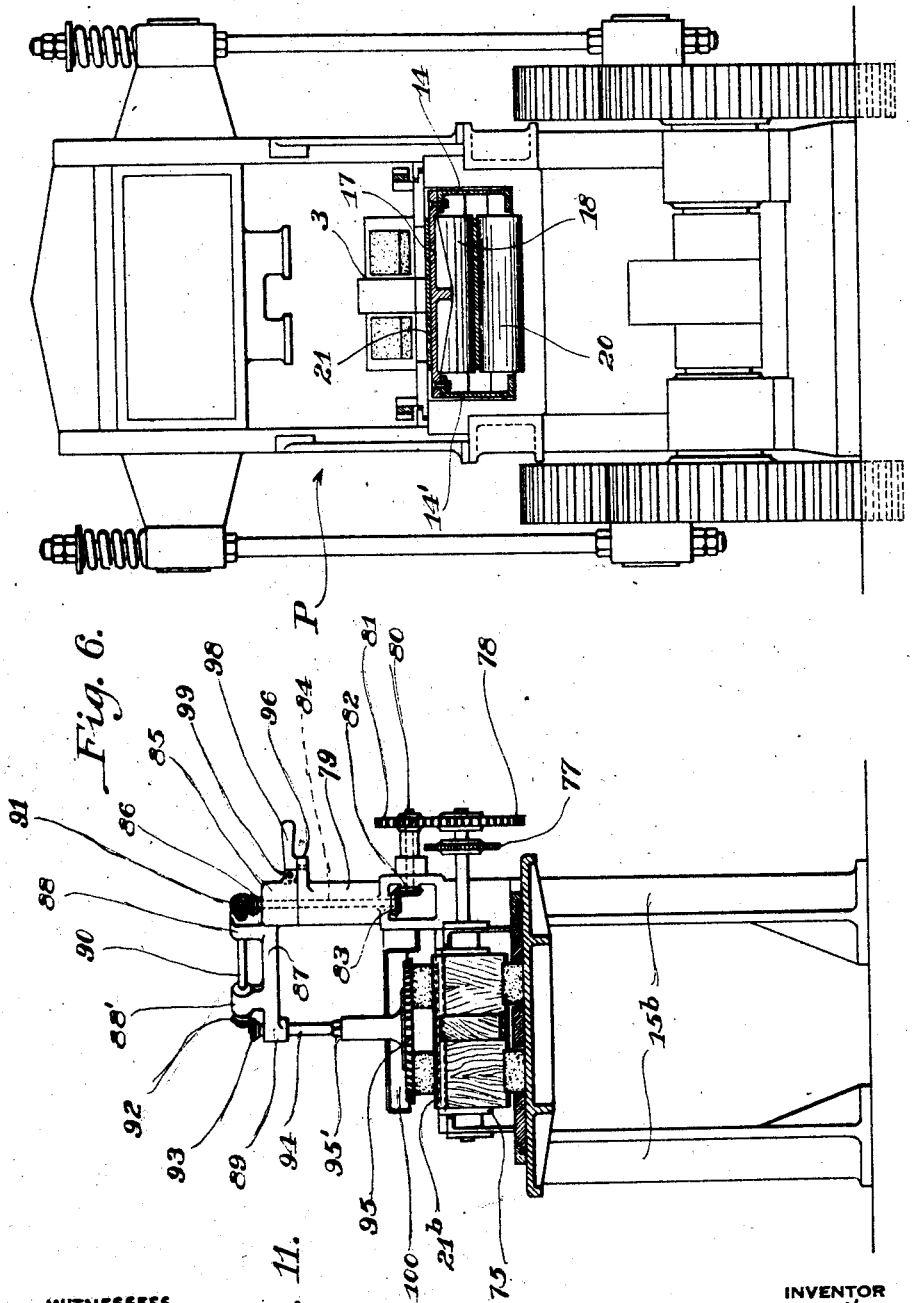
WITNESSESS
INVENTOR Dec. 15, 1925.

G. B. HANEY

BRICK MACHINE

Filed Nov. 28, 1923

1,565,738

6 Sheets-Sheet 5

WITNESSES

INVENTOR
George B. Haney
by Winter & Brown
his Attorneys

Dec. 15, 1925. 1,565,738
G. B. HANEY
BRICK MACHINE
Filed Nov. 28, 1923 6 Sheets-Sheet 6

WITNESSES
INVENTOR
George B. Haney
by Winter & Brown
his attorneys

Patented Dec. 15, 1925.

1,565,738

UNITED STATES PATENT OFFICE.

GEORGE B. HANEY, OF ASHLAND, KENTUCKY, ASSIGNOR TO ASHLAND FIRE BRICK COMPANY, OF ASHLAND, KENTUCKY, A CORPORATION OF KENTUCKY.

BRICK MACHINE.

Application filed November 28, 1923. Serial No. 677,392.

*To all whom it may concern:*

Be it known that I, GEORGE B. HANEY, a citizen of the United States, and a resident of Ashland, in the county of Boyd and State of Kentucky, have invented a new and useful Improvement in Brick Machines, of which the following is a specification.

This invention relates to brick-making machinery, and particularly to a pressing and repressing mechanism associated with an interposed brick sizing device or trimmer, and conveyors for moving the bricks from the press into position to be acted upon by the trimmer and progressively to the repress.

It is an object to provide a brick machine which is simple and sturdy in construction, which will not easily get out of order, which is economical to install, and which will operate in an efficient manner.

It is a special object to provide a machine of the character referred to in which the bricks during their passage through the trimmer located between the press and repress will be firmly supported, and in which the trimmer mechanism is so associated with the remaining parts as to permit ready adjustment to produce bricks of any desired thickness within the predetermined ranges for which the machine is designed.

It is also a special object to provide a trimmer of novel construction which is capable of effecting a positive cutting action upon the bricks instead of a mere shearing action frequently found in machines now upon the market.

Another object is to provide a trimmer mechanism including means by which the cuttings are effectively removed, and in which said means are not directly connected to the cutting element of the trimmer whereby to simplify the cutting parts, to render same more accessible, and to assure an unretarded cutting action thereby.

A further special object is to provide a machine comprising a series of progressively arranged conveyors with an interposed surfacing plate upon which the bricks are directly supported during the period they are acted upon by the trimmer, and over which they are moved for perfecting their lower faces before entry into the repress.

It is still a further special object to provide a trimmer mechanism which is self-cleaning whereby to automatically discharge the cuttings as soon as they are removed from the brick, and in which the cutting elements may be readily moved to non-cutting position without interfering with the functioning of the press and conveyors whenever desired.

An additional special object is to so arrange the several parts that the following end faces of the bricks being acted upon by the trimmer mechanism will be firmly contacted, and laterally supported by the next succeeding bricks supplied from the press whereby to prevent breakage of the upper rear following edge of the brick as it passes under the cutting element, thus assuring the production of a brick of substantially even thickness throughout its entire extent.

These and other objects of the invention will more fully appear when taken in conjunction with the following description and the appended claims.

Figure 7:
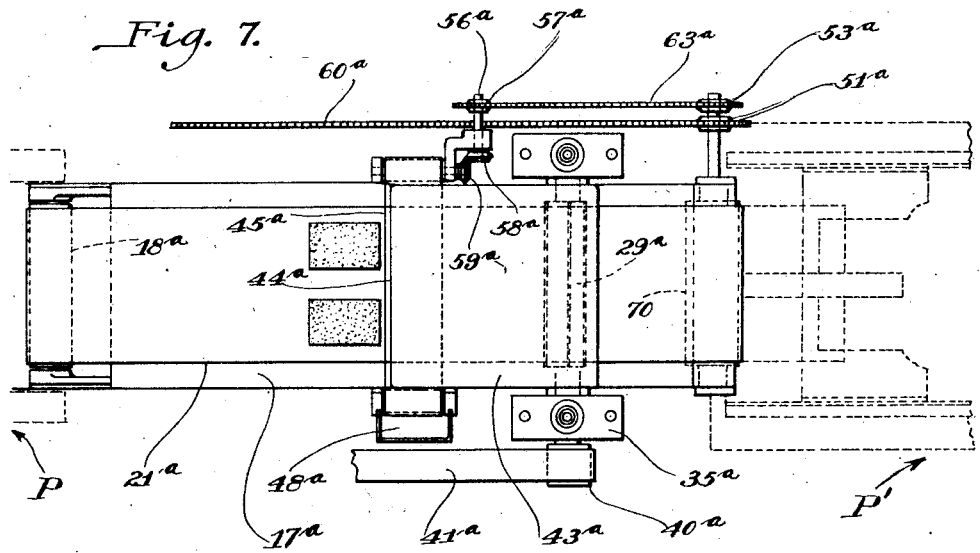
Figure 8:
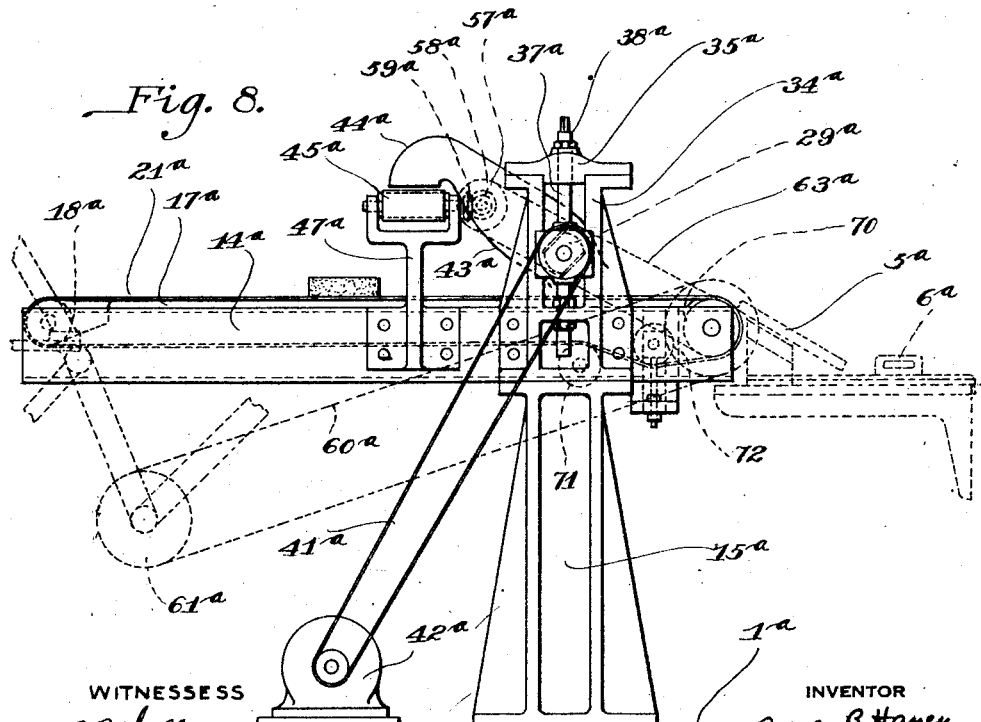
Figure 9:
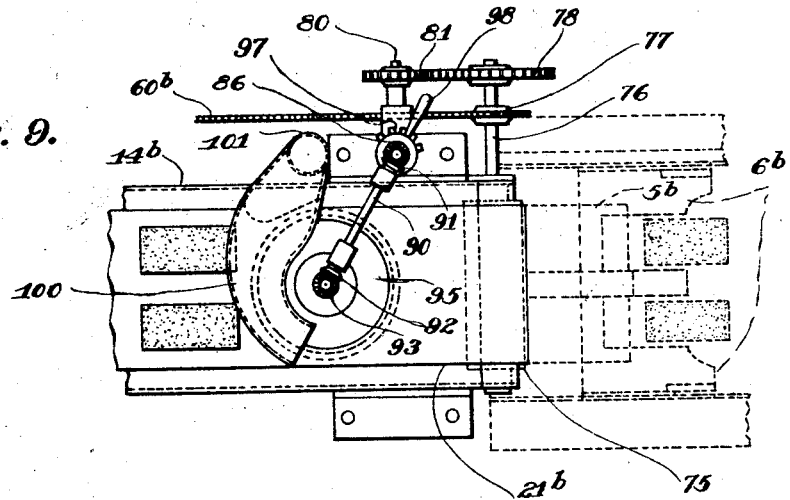
Figure 10:
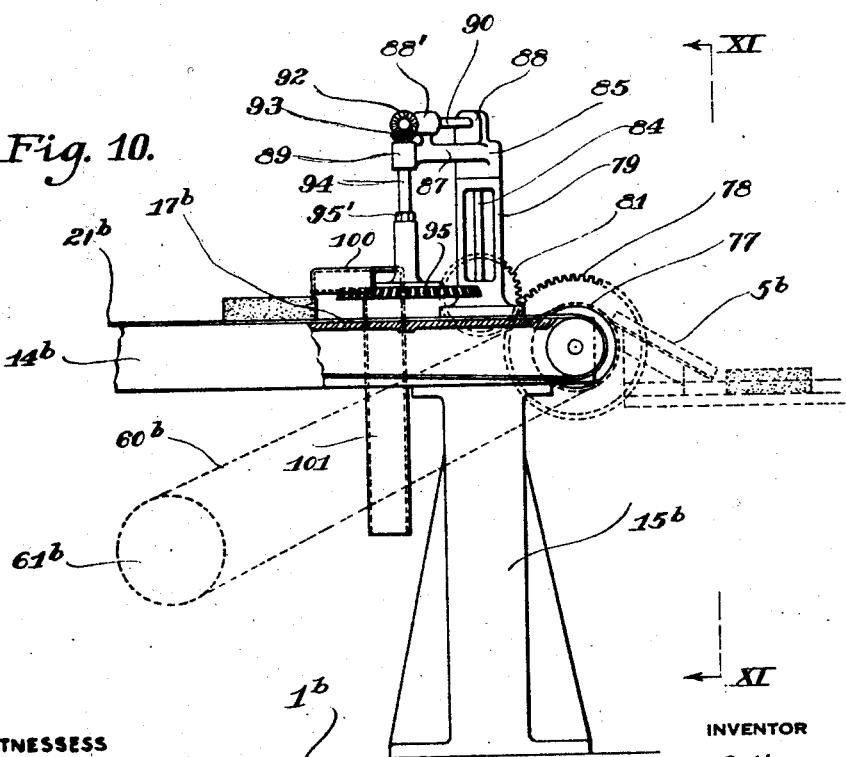

In the drawings, which illustrate several embodiments of the invention, Fig. 1 is a plan view of one embodiment thereof; Fig. 2 a side view, partly in elevation and partly in section, of the machine illustrated in Fig. 1; Fig. 3 a vertical transverse sectional view taken substantially on the line III—III of Fig. 2; Fig. 4 a vertical sectional view through the trimmer mechanism taken substantially on the line IV—IV of Fig. 2; Fig. 5 a similar view taken through the receiving table of the repress and looking in the direction of the trimmer mechanism, the section being taken substantially on the line V—V of Fig. 2; Fig. 6 a transverse vertical sectional view through the conveying mechanism located between the press and trimmer taken substantially on the line VI—VI of Fig. 2; Fig. 7 a fragmentary plan view of a modified form of the invention; Fig. 8 a fragmentary view in side elevation of the parts illustrated in Fig. 7; Fig. 9 a fragmentary plan view of a still further modification of the invention; Fig. 10 a side elevation, with parts broken away of the embodiment illustrated in Fig. 9; and Fig. 11 a transverse sectional view taken substantially on the line XI—XI of Fig. 10.

In the drawings P, P' and T, represent generally the press, the repress, and trimmer mechanism, respectively. All of these mechanisms are suitably mounted upon any desirable support 1 and successively arranged in spaced relation to each other in the manner shown in Figs. 1 and 2.

Both the press and the repress, except in so far as they are particularly arranged with relation to the remaining parts and as hereinafter described in detail, are of a conventional standard form of construction now upon the market. For this reason, the entire construction of the presses will not be described in detail, both their structure and mode of operation being well known to those familiar with the art, and is apparent from the drawings.

For the purposes of this invention, it is sufficient to set forth that the press is provided at its inlet or receiving end with a receiving apron 2 over which a pull-over device 3 is adapted to be reciprocated by the conventional type of mechanism shown, the bricks 4 to be operated upon by the press P being fed upon the inclined portion of the pull-over, then sliding downwardly thereon so as to be caught by the transversely extending bar of the pull-over for delivering the same into the press.

Likewise, bricks which are delivered to the inclined plate 5 slide downwardly under the influence of gravity into a position to be caught by the transversely extending parts of the pull-over 6 of the repress and are fed thereinto in a similar manner, and after being acted upon by the repress are disposed upon an endless conveyor belt so as to be discharged in an obvious fashion.

Power for operating the presses is delivered from any suitable source by means of the belt 7 to the pulley 8 mounted upon the shaft 9 of the repress, which shaft also carries another pulley 10 which transmits power through the belt 11 to the pulley 12 carried by the shaft 13 of the press.

Attached to the delivery side of the press and projecting laterally therefrom is a pair of channel beams 14, 14', the ends of which rest upon the flanged upper portions of a pair of vertical standards 15, 15', respectively, a cross bar or brace 16 extending between the upper portions of the standards. Resting upon the upper edges of the channel beams 14, 14', and bridging the space therebetween is a supporting plate 17.

Journalled for rotary movement in the channel members 14, 14' and located therebetween are a plurality of cylindrical belt conveyor drums 18, 18', 19, 19', and likewise journalled therein is a guide pulley or drum 20. An endless belt conveyor consisting of the upper limb 21 and the lower limb 21', passes around the drums 18, 18', the drum 18 being disposed immediately adjacent the discharge end of the press, while the drum 18' is located immediately adjacent the trimmer mechanism to be subsequently described in detail. For the purpose of varying the tension of the conveyor belt 21—21' a tightener pulley or drum 22 is employed, the drum 22 being capable of being bodily moved by adjustment of the nuts 23, 23', engaging the threaded extremities of rods 24 depending from the end bearings of the drum, and projecting through apertures in the lower ends of brackets 25.

The plate 17 extends substantially the entire distance between the drums 18, 18', and lies immediately below the upper limb 21, so as to effectively prevent sagging of the upper limb of the conveyor plate during the transfer of the bricks carried thereby.

Cooperating with the drums 19, 19', is a second endless conveyor belt comprising the upper and lower limbs 26, 26', respectively, and a supporting plate 27, extending between the channel members 14, 14' is likewise disposed immediately below the upper limb of the plate, similar to the method employed in connection with the conveyor belt 21—21'.

In the embodiment of the invention illustrated in Figs. 1 to 6, the trimmer mechanism consists of a surfacing plate 28 disposed directly between the two endless belt conveyors, just described, is supported by means of the channel members 14, 14', and is disposed so as to have its upper surface lying in substantially the same plane as the upper surface of the upper limbs of the conveyor belts. In other words, the upper surface of the surfacing plate 28 and the top surfaces of the upper limbs of the conveyor belts form a substantial continuation of each other.

Mounted directly above and in spaced relations to the surfacing plate 28 is a rotary jointer 29, and as illustrated is equipped with a pair of cutting blades 30, 30', it being understood, however, that the number of cutting blades may be varied in accordance with the service to which the machine is to be put. The rotary jointer is mounted for bodily adjustment in a vertical direction by having the ends 31, 31' of its shaft journalled in bearings 32, 32', respectively, which bearings are adjustable in the supporting brackets 33, 33'. Since the construction at either side of the machine is identical, it will be necessary to describe but one of these brackets, and the means for adjusting the bearing. The bracket consists of a pair of vertically extending members 34, 34' surmounted by a cap piece 35, and bridged by a transversely extending bar 36, the entire bracket being bodily connected to the channel bar 14, 14', as the case may be. The bearing for the shaft of the jointer, is equipped with a pair of oppositely extending rods 37, 37', the former extending upwardly through an aperture in the cap piece 35, while the latter projects downwardly through an opening in the cross piece 36. Both the rods are threaded, the upper end of the rod 37 being equipped with the nut 38 resting upon the upper surface of the cap piece 35, while the rod 37' is provided with the nuts 39, 39', disposed at the opposite sides of the cross piece 36. By adjusting the several nuts, the bearing may be positioned vertically at any desired point so as to position the jointer at predetermined distances from the surface plate 28. The extremity of the jointer shaft is equipped with the pulley 40 which is adapted to be driven by means of the belt 41 extending from the driving pulley of an electric motor 42 suitably mounted upon the support 1.

The inner end of a tubular collecting hood 43 surrounds the rotary jointer, the said inner end being so shaped as to lie in close proximity to the upper surfaces of the bricks being trimmed. The opposite open end of the hood 43 is curved as shown at 44 and terminates immediately above a transversely extending conveyor belt 45. The belt 45 is supported by cylindrical supporting drums 46, 46', rotatably journalled in upwardly extending forked brackets 47, 47', bolted respectively to the channel beams 14, 14'. One end of the conveyor belt 45 extends within the upper part 48 of a tubular discharge chute 49 extending downwardly at one side of the machine, as clearly shown in Fig. 3 of the drawings.

The shaft of the conveyor drum 19' projects outwardly at one side of the machine as indicated at 50 and is equipped with three sprocket wheels 51, 52 and 53. The shaft of the drum 18' likewise projects outwardly and carries the sprocket wheel 54.

One of the brackets 47 is provided with a lateral extension forming a bearing 55 in which is journalled a stub shaft 56 having a sprocket gear 57 at its outer end and a bevel pinion 58 at its inner extremity. The pinion 58 meshes with a similar pinion 59 fixed to the shaft of the drum 46.

Power is transmitted to the sprocket wheel 51 by means of the sprocket chain 60 meshing with the gear 61 operatively connected with the driving gearing of the press P in any desired way. The sprocket wheels 52 and 54 are connected by the sprocket chain 62 and the sprocket wheels 53 and 57 are similarly connected by the sprocket chain 63. In this manner, both of the endless conveyor belts 21—21' and 26—26' are actuated, as well as the transversely extending conveyor belt 45. The driving gearing of the re-press P' is likewise operatively connected through a sprocket wheel 64, sprocket chain 65, and the sprocket wheel 66 fixed to the shaft 67 of one of the drums for the conveyor belt 69 whereby to actuate the conveyor at the discharge side of the re-press.

Instead of employing a pair of successively arranged conveyor belts with an interposed surfacing plate, as above described, a single conveyor belt may be employed at the discharge side of the press for delivering the bricks from the press to the re-press, and the trimmer mechanism suitably arranged so that the bricks during their passage will be forced to pass under the cutting element of the trimmer. A modified construction comprising such an arrangement is illustrated in Figs. 7 and 8. In this embodiment, channel beams 14$^a$, corresponding to the channel beams 14 and 14' project laterally from the press in a similar manner, and surmounting these beams and bridging the space therebetween is a supporting plate 17$^a$. Journalled for rotation in the channel members 14$^a$ at a point adjacent the press is a conveyor drum 18$^a$, and a similar drum 70 is mounted adjacent the ends of the channel members. An endless conveyor belt, the upper limb of which is indicated at 21$^a$ cooperates with these drums, and for the purpose of guiding the belt and adjusting the tension thereof, a guide drum 71 and an adjustable tightening drum or pulley 72 is also employed, all of these drums corresponding generally with the several drums used in connection with the endless conveyor 21—21' of the first described embodiment.

A trimmer mechanism, similar to the one first described is employed, the same being positioned near the discharge side of the conveyor with the cutting element 29$^a$ thereof disposed in spaced relation above the upper limb of the conveyor belt, this limb of the belt resting directly upon the underlying supporting plate 17$^a$. The supporting parts, their mode of connection, and arrangement are substantially the same as in the preferred embodiment already described, and for this reason need not be set forth in detail. This is also true of the collecting hood for the chips removed from the bricks, as well as the means employed for discharging the chips to the side of the machine. Since the construction and arrangement of all of these parts is apparent from the drawings, taken with the previous description, the same will not be re-described in detail, the several elements of this modification corresponding to similar parts in the preferred embodiment being similarly designated by the same reference numeral with an added exponent $a$.

In both of the embodiments described, the cutting element of the trimmer mechanism consists of a horizontally disposed rotary jointer which is capable of bodily adjustment in a vertical direction, the jointer utilizing a plurality of cutting knives or blades. Instead of employing a trimmer of this character, a trimmer such as illustrated in Figs. 9 to 11 may be employed. In this modification, the channel members extending from the press are indicated at 14$^b$, and are surmounted by a supporting plate 17$^b$, in a manner corresponding generally with the previously described forms, and the ends of the channel members are likewise supported by the upstanding standards 15$^b$. The upper limb of the conveyor belt 21$^b$ rides in contact with the plate 17$^b$ and is supported at its outer end by means of the conveyor drum 75, which drum is equipped with a shaft 76 extending laterally therefrom and carrying the sprocket wheel 77 and the gear 78.

Mounted at one side of the machine and extending in a vertical direction is a gear housing 79. Suitably journalled in this housing is a laterally extending stub shaft 80 carrying at its outer extremity a gear 81 meshing with the gear 78. The inner end of the stub shaft 80 has attached thereto a bevel pinion 82 which meshes with a similar bevel pinion 83 fixed to the lower extremity of a vertically extending shaft 84 mounted in the housing 79. Surrounding the upper extremity of the shaft 84 and resting upon the top of the housing 79 is a bearing bracket 85, the shaft 84 projecting entirely through the bearing bracket and carrying a bevel pinion 86 at its upper end. The bearing bracket 85 has attached thereto a laterally extending arm 87 provided with a pair of spaced bearings 88, 88' at the upper side thereof and with a terminal bearing boss 89. Journalled in the bearings 88, 88', is a shaft 90 having fixed at one end a bevel pinion 91 meshing with the pinion 86, and carrying a similar pinion 92 at its other end which meshes with a pinion 93 fixed to the upper end of a rotatable shaft 94 journalled in the terminal bearing boss 89.

The shaft 94 extends downwardly carrying at its lower end a rotatable cutting element in the nature of a circular saw 95. The saw 95 is preferably threaded on the lower extremity of shaft 94, being held in locked relation by the lock nut 95', and is supported immediately above the upper limb of the conveyor belt 21$^b$ and in spaced relation therewith similarly to the disposition of the jointer in the remaining embodiments.

The upper extremity of the housing 79 is provided at one side thereof with a laterally extending flange 96 having a number of notches 97 which are adapted to be engaged by a depending lug on a locking latch 98 carried by the bearing bracket 85 and pivotally connected thereto at 99, the depending lug of the latch being readily removed from the notches by lifting the same upwardly about its pivotal connection and adapted to be selectively engaged with any of the notches 97 so as to lock the bearing bracket 85 in a suitable position for positioning the arm 87 and the saw 95 as desired.

Embracing one side of the saw 95 is the open inlet end of a tubular collecting hood 100, this hood extending laterally to one side of the machine along which the discharge tubular portion 101 thereof depends as clearly shown in Fig. 10.

The conveyor belt 21$^b$ is adapted to be actuated by means of a sprocket chain 60$^b$ which operatively engages the gear 77, and is connected to a gear 61$^b$ driven by means of any suitable connection with the driving gearing of the press.

In this modified form, a number of the parts correspond to the parts used in the preferred embodiment of the invention and in order to avoid repetition, such parts have been indicated by similar reference numerals with the added exponent $b$.

The operation of the machine will be obvious from the above description. Bricks are initially fed to the press P, being deposited upon the inclined portion 3 of the pull-over mechanism so as to be fed into the die portion of the press. After being acted upon by the press P, the bricks are forced onto the conveyor belt 21—21' at the region of the drum 18. The bricks are then carried by the first conveyor 21—21' and deposited upon the surfacing plate 28, being forced to travel under the rotary cutting element 29. The trimmed brick after leaving the trimmer mechanism is gripped by the endless conveyor 26—26' and delivered to the inclined plate 5 down which it slides into a position to be gripped by the pull-over mechanism 6 of the repress. The bricks are then fed into the repress and after being acted thereupon are finally delivered to the endless conveyor belt 69 and discharged therefrom in an obvious fashion.

It is noted that the relative positioning and the dimensions of the parts forming the two endless conveyor and the supporting surfacing plate are such that the brick being acted upon by the cutting element is contacted by the next succeeding brick delivered by the conveyor 21—21' before being completely trimmed. In other words, the rear or following end of the brick acted upon by the trimmer is contacted by the succeeding brick delivered from the press and forced to travel under the cutting element in abutting relation during the final trimming of the brick. In this way, the rear end of the brick is laterally supported during the final stages of the trimming operation and precludes the breaking off of the corner of the brick at the following edge thereof during its passage under the cutting blades. This abutment by the succeeding brick therefore not only assists in forcing the brick being operated upon to pass under the cutting blade but at the same time assures the production of a trimmed brick having substantially the same thickness throughout its entire extent. This feature is considered of great practical importance from the commercial viewpoint.

The chips or cuttings removed from the upper surface of the brick as it passes under the cutter are caught by the tubular collecting hood 43 and deposited upon the transversely extending conveyor belt 45 by which they are discharged into the chute 49 at one side of the machine.

Due to the method of mounting the rotary jointer, it may be easily positioned at any height necessary to secure the desired thickness of trimmed brick, or may be lifted sufficiently high to place the same in a non-cutting position whenever it is desirable to omit the trimming operation.

Due to the fact that the upper limb 21 lies directly in contact with the underlying supporting plate 17 and the upper surface of the surfacing plate 28 is positioned in substantial alignment with the top surfaces of the two conveyors, the bricks during their passage through the trimmer are not only firmly supported but are forced to travel in a direct line, thus assuring a neatly trimmed brick of uniform thickness.

In the modified form of the invention shown in Figs. 7 and 8, the brick is firmly supported and positioned against vertical displacement during its passage through the trimmer mechanism by means of the plate 17$^a$. After leaving the trimmer, the trimmed bricks are deposited upon the inclined plate 5$^a$ and delivered onto the receiving apron or table of the repress in a position to be gripped by its pull-over device 6$^a$, as in a manner similar to that already described.

In the embodiment shown in Figs. 9 to 11, the bricks are firmly supported upon the conveyor belt 21$^b$ due to the underlying supporting plate 17$^b$ and are caused to travel under the cutting saw 95 under the influence of the conveyor in an obvious fashion, being finally discharged upon the inclined plate 5$^b$ and delivered upon the receiving apron of the repress so as to be gripped by its pull-over device 6$^b$.

The cuttings or chips from the circular saw are caught by the tubular collecting hood 100 and finally discharged at one side of the machine through its discharge portion 101. Due to the threaded connection of the saw on the shaft 94, the saw can be readily adjusted so as to trim the bricks to the desired thickness. The angular position of the cutting saw may also be changed at will by means of the locking latch 98. By simply lifting the latch 98 sufficiently to withdraw its depending lug from the notches of the flange 96, the arm 87 together with the parts mounted thereon and supported thereby may be swung about the axis of the shaft 84. In this manner, the cutting saw may be entirely withdrawn from the collecting hood 100 and moved to an inoperative or non-cutting position whenever desired.

It is thus seen that the invention provides a brick making machine which is simple and sturdy in construction, which will not easily get out of order, which will operate in an efficient manner, which permits ready adjustment for the production of bricks of any desired thickness within predetermined ranges of the machine, which assures a positive cutting action upon the bricks throughout their entire extent instead of a mere shearing action frequently resulting in breakage of the corners of the bricks, which firmly supports the bricks against vertical displacement during the entire passage through the trimming mechanism, one in which the bricks during the time they are acted upon by the cutting elements of the trimmer are laterally supported, one in which the cuttings from the trimmed bricks are automatically caught and discharged to one side of the machine, and one in which the trimmer mechanism may not only be readily adjusted to produce bricks of varying thickness but which is capable of being easily moved into an inoperative or non-cutting position.

I claim:

1. A brick machine comprising in coordinated relation a press, a brick trimmer, a repress, and a brick conveyor, the trimmer being positioned above the conveyor and adapted to remove excess material from the tops of bricks passing thereunder, and the conveyor comprising a brick-supporting horizonally-moving member passing under the cutter in positively spaced relation thereto.

2. A brick machine comprising in coordination a press, a repress, and a trimmer positioned between the press and repress adapted to remove excess material from the tops of bricks passing from the press to the repress, an endless belt conveyor between the press and repress passing under the trimmer and adapted to carry bricks from the press toward the repress, and a spacing plate positioned immediately beneath the upper limb of the conveyor belt and directly below the trimmer whereby to maintain a positively spaced relation between the conveyor and trimmer.

3. A brick machine comprising a press, a trimmer spaced therefrom, a conveyor belt for receiving the bricks from the press and forcing them through the trimmer, said trimmer comprising a rotary cutting element for engaging the brick, means for rotating the same, and a chip-conducting hood surrounding the said cutting element for receiving the chips removed from the brick.

4. A brick machine comprising a press, a trimmer spaced therefrom, a conveyor belt for receiving the bricks from the press and forcing them through the trimmer, said trimmer comprising a rotary cutting element for engaging the brick, means for rotating the same, and means for vertically adjusting the cutting element whereby to vary the thickness of the trimmed brick.

5. A brick machine comprising a press, a trimmer spaced therefrom, a conveyor belt for receiving the bricks from the press and forcing them through the trimmer, said trimmer comprising a rotary cutting element for engaging the brick, means for rotating the same, means for vertically adjusting the cutting element whereby to vary the thickness of the trimmed brick, and a hood surrounding the said cutting element for receiving the chips removed from the brick.

6. A brick machine comprising a press, a trimmer spaced therefrom, a conveyor belt for receiving the bricks from the press and forcing them through the trimmer, said trimmer comprising a rotary cutting element for engaging the brick, means for rotating the same, means for vertically adjusting the cutting element whereby to vary the thickness of the trimmed brick, a tubular hood having one end surrounding the cutting element for receiving the chips removed from the brick, and a conveyor disposed at the opposite end of the hood for receiving the chips and discharging the same laterally of the machine.

7. A brick machine comprising a press, a trimmer spaced therefrom, a conveyor belt for receiving the bricks from the press and forcing them through the trimmer, said trimmer comprising a rotary body, a plurality of knives spaced circumferentially of said body, with their cutting edges projecting beyond the periphery of the body.

8. A brick machine comprising a press, a trimmer spaced therefrom, a conveyor belt for receiving the bricks from the press and forcing them through the trimmer, said trimmer comprising a rotary body, a plurality of knives spaced circumferentially of said body, with their cutting edges projecting beyond the periphery of the body, and a tubular chip-conducting hood surrounding the said body with the receiving end thereof lying closely adjacent the upper surfaces of the bricks passing through the trimmer.

9. A brick machine comprising a press, a trimmer spaced therefrom, a conveyor belt for receiving the bricks from the press and forcing them through the trimmer, said trimmer comprising a rotary body, a plurality of knives spaced circumferentially of said body, with their cutting edges projecting beyond the periphery of the body, and an upwardly extending open-ended tubular chip-conducting tube surrounding the said body with the receiving end thereof terminating in a plane slightly above that of the upper surfaces of the bricks traversing the trimmer.

In testimony whereof, I sign my name.

GEORGE B. HANEY.